3,598,282

APPARATUS FOR MELTING AND FEEDING SOLIDIFIED MATERIAL

BACKGROUND OF THE INVENTION

This invention relates to a method and apparatus for melting solidified material and feeding the resultant liquid to a collecting chamber, metering means, mixing means, dispensing equipment, etc. This invention has wide application in situations where materials to be utilized in the liquid state are supplied to the user in the solid state. Apparatus for melting solidified material and feeding the resultant liquid are known as evidenced by U.S. Pat. Nos. 2,773,496; 2,809,772 and 3,032,635.

Though the invention is capable of wide application as indicated hereinabove, it will generally be described hereinafter with reference to the problems encountered when handling MOCA (DuPont Registered Trademark) which is a curing agent for liquid urethane elastomers, epoxy resins, and blends of liquid urethane polymers and epoxy resins. Its chemical composition is "4, 4' methylenebis (2-chloraniline)." MOCA is sold in solid state form as pellets which must be melted for processing. MOCA cannot be kept in the liquid state at too elevated a temperature for too long a time without detrimental effects on its vulcanizate properties. Further, it is quite toxic and will decompose at approximately 400° F. (204° C.) and once decomposition commences, it is exothermic and becomes self-sustaining. For this reason, it is recommended by the manufacturer that a processing temperature of 295° F. (140° C.) be considered a maximum operating temperature even for short term exposure. Since its melting range is from 212° to 228° F. (100° to 109° C.), it is usually processed at temperatures between 240° and 250° F. (116° to 121° C.).

It is an object of this invention to provide an improved method and improved apparatus for melting solidified material and feeding the resultant liquid to a utilization means. It is a further object of this invention to provide such a method and apparatus for melting solidified material, which material preferably should not be heated above a certain temperature, at a faster rate than previously possible to provide both a faster start up time and greater volume flow.

SUMMARY OF THE INVENTION

According to the invention, there is provided apparatus for melting solidified material and feeding the resultant liquid which apparatus comprises a vertically disposed hopper for receiving the solidified material, a heating member disposed across the bottom of the hopper for melting the solidified material, the heating member being shaped to promote fluid flow towards its outer perimeter, and liquid passage means disposed adjacent the outer perimeter of the heating member for receiving liquid flowing over the outer perimeter. The provision of a heating member shaped to promote fluid flow towards its outer perimeter, i.e. a member having an upper surface or surfaces sloped downwardly towards the inner wall of the hopper, results in a larger volume liquid flow than heretofore possible with a similar sized hopper. It is believed that this is due to the fact that a heating member shaped to promote liquid flow towards its outer perimeter presents a larger heating surface than would a flat member, collection of fluid in any one or more places is avoided, and the resultant liquid is removed as soon as it reaches the heating member outer perimeter. The prevention of the collection of liquid in puddles or the like is important in that once the material is changed to its liquid state, unduly excess additional heat is not wasted in further heating the liquid and, where it is important to avoid heating the liquid to a predetermined high temperature, the temperature of the liquid can be maintained below the aforesaid high temperature.

In accordance with a further feature of the invention, the liquid passage means are defined by a flangelike member which surrounds the outer perimeter of the bottom of the heating member and defines a liquid passage therewith. This permits the liquid to be quickly removed and has therefore resulted in an increased melting rate. In accordance with a still further feature of the invention, the flangelike member is itself heated to further increase the melting rate. Yet another feature of the invention resides in the feature of providing a depending flange portion depending from the outer perimeter of the bottom of the heating member and spaced from the flangelike member to define a liquid passage therebetween. The flangelike member and the depending flange portion terminate at different vertical positions to provide an uneven exit gap from the liquid passage to reduce the surface tension between the liquid and the inner surfaces of the liquid passage.

There is further provided according to the invention a method for melting solidified material and feeding the resultant liquid including the steps of disposing the solidified material in a vertical hopper, melting the solidified material by heating a surface of a heating member positioned across the bottom of the hopper and shaped to promote liquid flow towards its outer periphery, and supplying more heat to material disposed adjacent to a bottom portion of the heating surface than to material disposed adjacent to the remainder of the surface to promote liquid flow in paths along the heating surface. A further feature of the method of the invention resides in initially melting material disposed adjacent the bottom portion of the heating surface prior to melting of material disposed adjacent the remaining upper portion of the heating surface.

BRIEF DESCRIPTION OF THE DRAWINGS

FIG. 1 is a side elevational view of apparatus for melting solidified material and feeding the resultant liquid in accordance with the present invention in which the melter itself is shown in cross section;

FIG. 2 is a cross-sectional view of a portion of the apparatus of FIG. 1; and

DESCRIPTION OF THE PREFERRED EMBODIMENT

Figure 4:
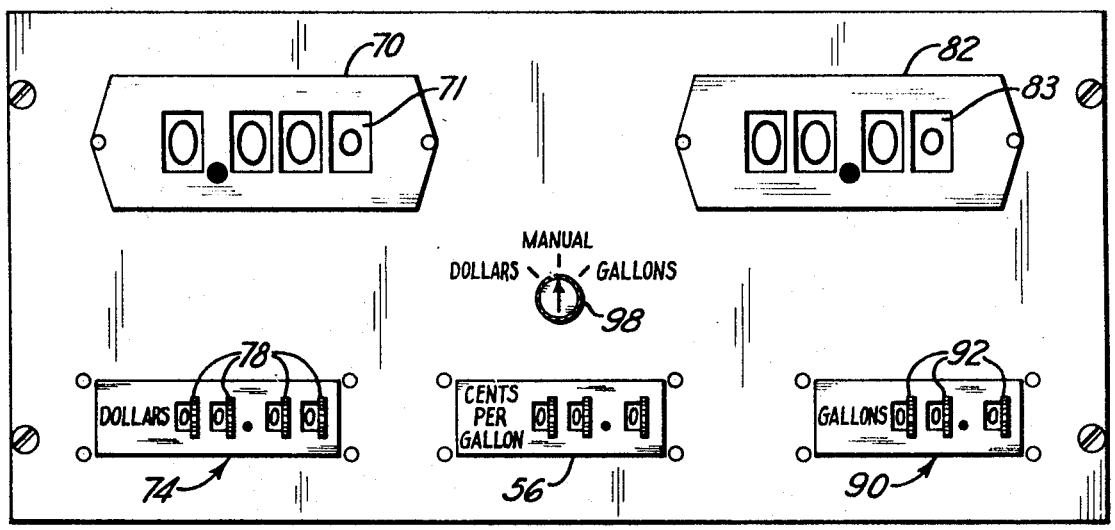

Referring to the drawings, a preferred embodiment of a melter 10 in accordance with the present invention is shown in FIG. 1. The melter 10 generally comprises a tank 12 supported in a vertical position by three equally spaced supporting legs 14 (only two of the legs are shown). Insulating material 16 surrounds a portion of the outer area of the sidewall 18 of the tank 12. A suitable cover (not shown) also is provided for hermetically sealing the tank 12. Though the melter 10 can be used as an open melter, the cover must be employed when it is desired to pressurize the interior of the tank 12 to force feed liquid therefrom and when melting material which gives off noxious fumes.

A control panel 20 is rigidly connected to and supported by a bracket 22 fastened to the back of the panel. An annular projecting member 24 is welded to the back of the bracket 22 and is rigidly connected to annular support member 28 by means of screws 34 (only one being shown). The annular support member 28 is welded to the outside surface of the tank sidewall 18.

A liquid receptacle forming member 36 is welded to the inner surface of the tank sidewall 18 to form a liquid collecting chamber 38 in the lower portion of the tank 12. An integral hopper and heater assembly 40 is positioned in the tank 12 above the collecting chamber 38. The integral assembly 40 includes a hopper support ring 42 for mounting the assembly 40 in a desired position within the tank 12. The hopper support ring 42 has an outside diameter which can be expanded slightly greater than the inside diameter of the tank 12 by turning nut 26 and thereby located at a desired predetermined distance from the top of the tank 12. A positioning plate 30 is used to lower the integral assembly 40 into the tank 12 to the said desired predetermined distance from the top. The plate 30 is triangularly shaped thereby permitting the access of a

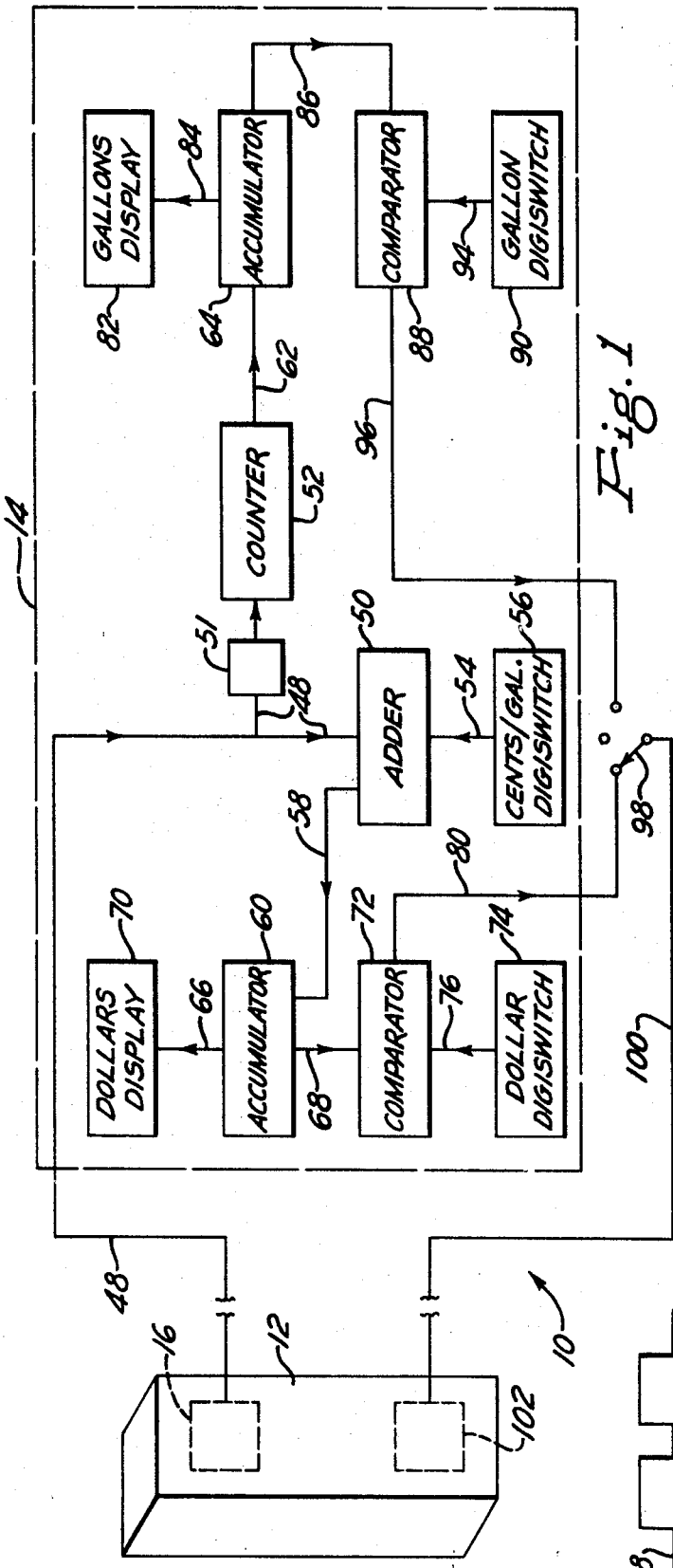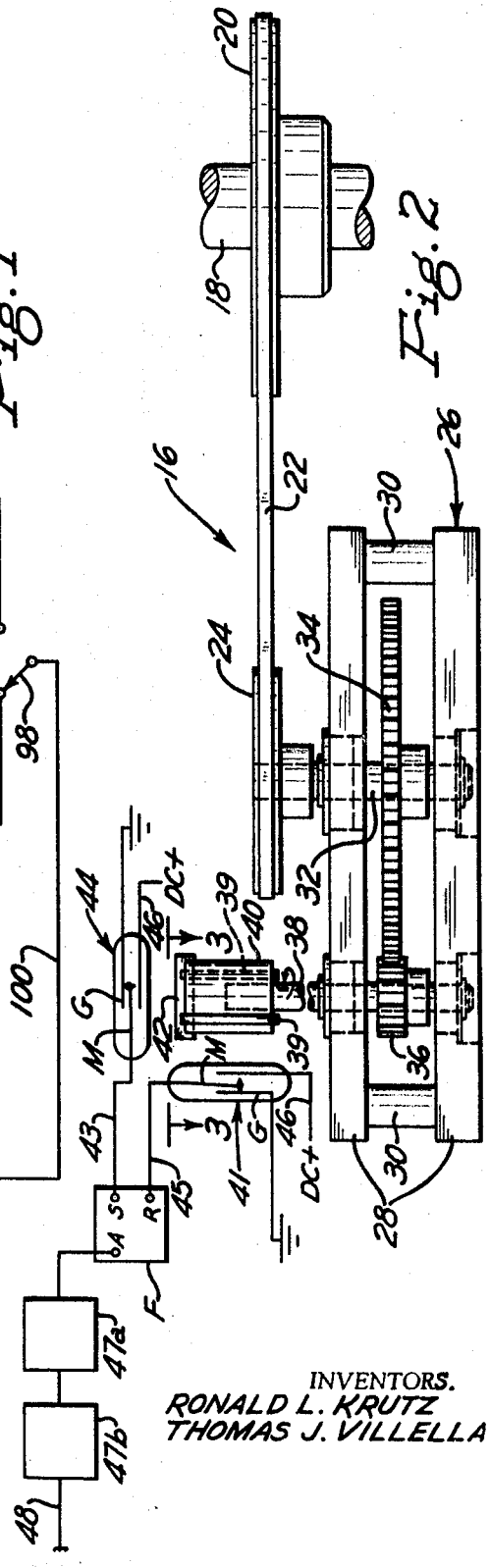

INVENTORS.
RONALD L. KRUTZ
THOMAS J. VILLELLA

GASOLINE PUMP COMPUTER

This invention pertains to apparatus in the nature of a digital computer for retail marketing of gasoline. In its broader aspects, the invention is adaptable for use with the marketing or dispensing of any liquid at a particular price per unit volume, wherein the features and advantages of the invention, as will appear more clearly below, are desirable. While the following description will be in the environment of retail marketing of gasoline utilizing equipment in wide spread use at the present time, it will be understood by those skilled in the art that the invention is not so limited, since it may have many other uses and applications in this and in other fields both presently and in the future.

At present, when a customer desires to purchase a quantity of gasoline, which is less than a full tank, for example, $2.00 worth, or 5 gallons, the attendant must manually operate the pump and manually stop it when the desired quantity has been dispensed. The present invention provides means wherein the attendant can merely set the customer's desired number of gallons or money value worth of gasoline on the apparatus, start the pump operating automatically in the usual manner, and attend to other matters such as cleaning the windshield, checking the oil, and performing other customer services. The apparatus of the invention will shut off the flow of gasoline when the preset number of gallons or preset money value has been dispensed. The apparatus of the invention may include many different kinds of devices which may be located at the main pump motor, or at the nozzle, or elsewhere in the flow path of the fuel to stop the flow at the signal of the circuit. Thus, the circuit of the invention provides a signal to be utilized by other means to physically stop the flow.

In addition to the circuit, the invention provides a relatively simple apparatus for use in converting existing commonly used above ground gasoline dispensing pumps for use with the invention. The circuit represents a predetermined number of electrical pulses per unit volume of gasoline passing through the pump, and this portion produces 100 electrical pulses per gallon. An advantage of this portion of the apparatus of the invention is that it is exceedingly simple in design, construction, and manner of installation into existing pump housings. One hundred pulses per gallon was chosen, in conjunction with the nature of the circuit because this number is decimal, is easily handled, and produces a commercially acceptable accuracy. Since the circuit is in the nature of a digital computer, each pulse is handled separately, and therefore an error of 1 or 2 pulses, corresponding to an error of 1 or 2 percent, only amounts to an error of 1 or 2 1/100's of a gallon, or that fraction of the price of the gallon in terms of money. Prior known devices produce a number of pulses substantially larger than 100 per gallon. This larger number of pulses is more difficult to handle in the circuit, or else requires means in the circuit to reduce the number of pulses operated upon to a number of the same order of magnitude as 100.

Another feature of the pulse producing portion of the invention is the inclusion of an array of reed switches and magnets to directly produce the pulses for, and at the voltage required by the circuit. Use of the reed switch array permits production of a relatively high voltage pulse, in the range of about 3 to 5 volts, directly. Certain known prior devices produce a very low voltage pulse, of the order of magnitude of 10 millivolts. Several disadvantages are inherent in the use of such low voltage pulses. Firstly, it must be amplified to be useful in other parts of the circuit. This requires the use of additional circuit elements to filter and amplify the pulse, thus further complicating the circuit and increasing its cost. Additionally, such a low voltage, high frequency, series of pulses are susceptible to interference from the electrical systems of vehicles which are, of course, very often close to gasoline dispensing apparatuses. Such interference can damage the circuitry or at least result in false counting. Both of these problems are avoided by the apparatus of the invention in that the relatively low frequency high-voltage pulses produced are both directly handleable by the circuitry and virtually not susceptible to interference from vehicles or other electrical systems in the vicinity.

The circuit portion of the apparatus of the invention has the advantages of providing continuous selection of prices to accommodate changes in the unit price, continuous selection of number of gallons to be dispensed in tenths of a gallon, and continuous selection of number of dollars worth of gasoline to be dispensed to 1 cent intervals. Prior known devices generally do not have these wide ranges of selectivity.

Another advantage is that the present invention provides a simple, purely electronic, highly temperature stable, highly reliable, inexpensive, and easily maintained circuit. Some prior known devices analogous to the circuit of the invention include complicated mechanical assemblages having many moving parts. Some of said prior devices include a number of oscillators each having a particular frequency chosen for a particular price. Such oscillators are expensive in and of themselves, and may require an oven or other temperature stabilizing means, depending upon geographical location. Another disadvantage of such oscillators is that a separate oscillator is required for each price at which it is desired to sell the gasoline, thus creating switching problems and further compounding the cost.

Because of its nature and simplicity, the circuit of the invention is adaptable to fabrication by modern large scale integrated circuit techniques, thus further and substantially reducing the cost of manufacturing mass production quantities. Thus, the entire circuit can relatively easily be fabricated in two or three such integrated circuit chips or packages. As an indication of orders of magnitude, each chip would weight about one-half an ounce, have a largest dimension less than 2 inches, and occupy a volume, including its connecting pins, of about one-half cubic inch. Any failure is corrected by simply plugging in a new chip. These types of integrated circuits are virtually completely temperature insensitive, thus permitting use of the invention in virtually any climate.

The pulse-generating portion of the invention is the only part which need by physically close to the pump, pipes, hoses, and the like equipment which physically dispenses the gasoline. The pulses may be easily transmitted, usually over electrical wires, thus permitting the displays and other computing equipment to be physically spaced from the pump. The ability to move the displays and computing circuitry away from the hose yields new freedom in station and pump design as compared to present shaft-coupled mechanical computing systems.

Another problem in such prior devices is that of timing. That is, the dollar and volume registers must be made to operate in response to the pulses, and means must be provided to prevent false counting. Small time delays between pulses in such prior devices are critical and can cause error. In the present invention the timing is inherent in that the pulses directly and simultaneously operate several key parts of the circuit, and other key parts are in cascade arrangement, thereby eliminating false counting. Small delays between pulses are not critical in the circuit of the invention.

The most important applications of this invention are anticipated as being in the future. There is a trend in modern times to self-service marketing of gasoline. This invention is adaptable to that field in that with the addition of suitable means to physically handle the money and automatically set the various switches, a completely self-service gasoline dispensing pump could be provided. Another present trend is to wide area inventory control, automatic computerized billing and marketing, and marketing research. Again, this invention lends itself to such future usage in that the dollar and gallon accumulation means can be made easily into data transmitters, and with a central point receiving such data from a plurality of locations in one area, these and other new or future systems can be accomplished.

Figure 3:
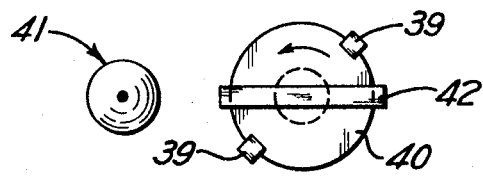
FIG. 3 is a prospective view of the heating member of the apparatus of FIG. 1.
Figure 5:
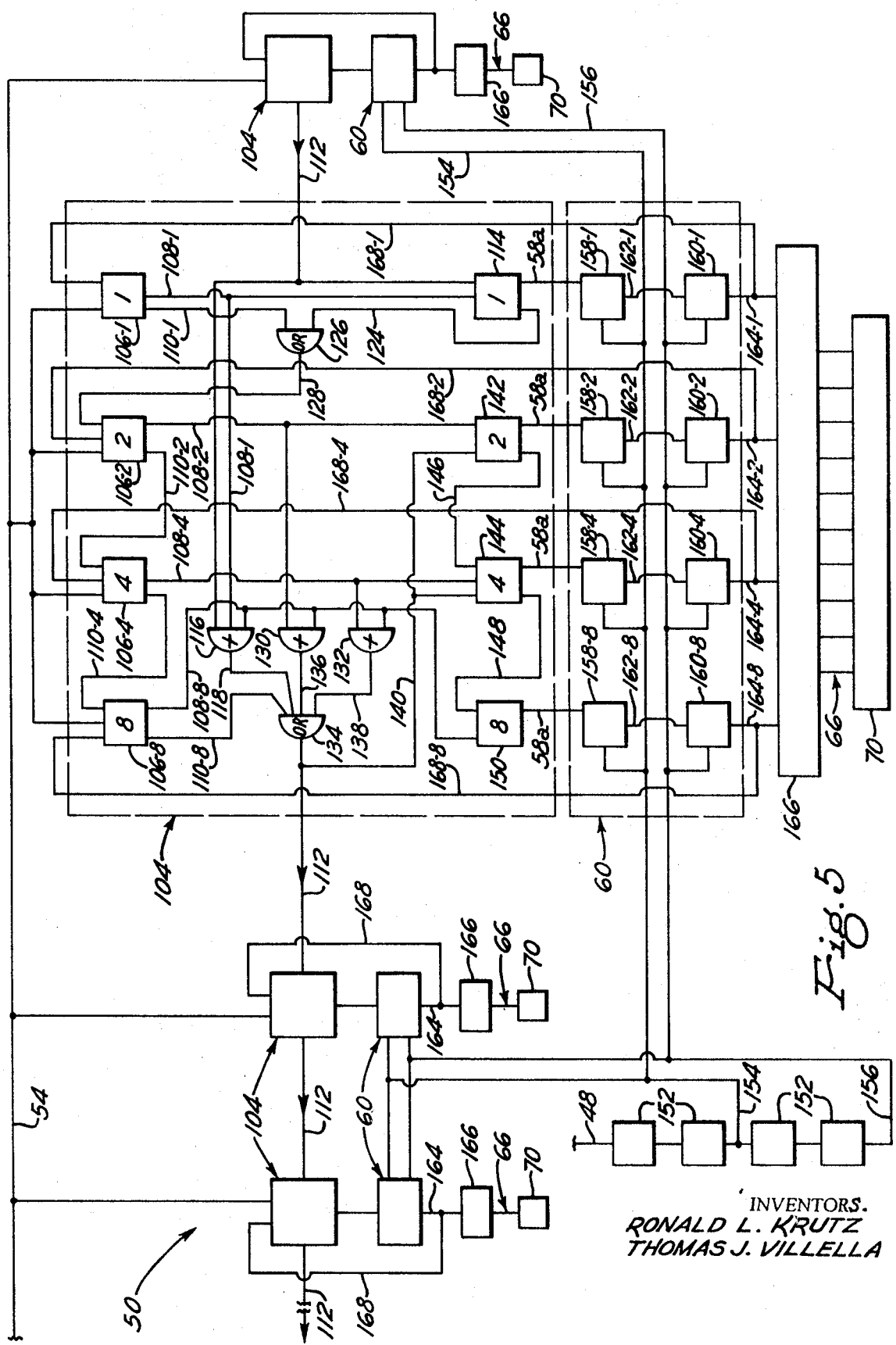

The above and other advantages of the invention will be pointed out or will become evident in the following detailed description and claims, and in the accompanying drawing also forming a part of the disclosure in which:

FIG. 1 is a schematic overall view of the apparatus of the invention;

FIG. 2 is a somewhat diagrammatic showing of the pulse-generating portion of the apparatus of the invention and part of the associated circuitry;

FIG. 3 is a view on line 3–3 of FIG. 0:

FIG. 4 is an external view of the control panel as it would appear to the operator and the customer; and FIG. 5 is a block diagram of part of the circuit.

Referring now in detail to the drawing, 10 designates an apparatus embodying the invention. Referring to FIG. 1, the overall apparatus 10 comprises the usual above ground dispensing pump 12 and a circuit enclosed by the dotted line box indicated at 14. The showing of pump 12 is purely diagrammatic in that the invention is applicable for use with pumps that have not yet been designed, such as, for example, service stations in the future wherein the pump assemblies might be totally below ground, or located in a central building, or other arrangements. For purposes of illustrating an operative embodiment however, pump 12 may be assumed to be the widely used above ground pump, and the invention will be described in converting such pumps.

A pulse-generating assembly 16 is provided inside of the housing of pump 12. Referring to FIG. 2, pulse generator 16 is shown in detail. Conventional pumps include a flow meter shaft 18. Shaft 18 is the only thing shown in FIG. 2 which is already existent in the pump, the remainder having been added in accordance with the invention. Shaft 18 typically rotates at a speed of 2 revolutions per gallon of gasoline pumped. Added to shaft 18 and fixed thereto is a pulley 20. An endless positive drive belt 22 is trained about pulley 20 and about an input pulley 24 of a gearbox 26.

The pulleys 20 and 24 and the belt 22 are matched to provide a positive drive. For example, a toothed belt with suitable pulleys, or a chain and gears, may be provided. In the successfully built embodiment of the invention, such a toothed belt was used.

Gear box 26 comprises a pair of supporting members 28 interconnected by crosspieces 30. Input pulley 24 is mounted on a first shaft 32 which is rotatably mounted between the support members 28, and carries a gear 34 therebetween. Gear 34 drivingly engages a pinion 36 mounted on a second shaft 38 rotatably mounted between the support members. At its outer end, shaft 38 carries a mounting block 40.

The remaining portion of the apparatus shown in FIG. 2, described below, provides means to convert the 2 revolutions per gallon at shaft 18 into 50 revolutions per gallon at shaft 38, to provide 100 electrical pulses per gallon, and to assure that no spurious pulses are introduced.

To this end, block 40 carries a bar magnet 42 in its free end face, and a pair of bar magnets 39 mounted in its side cylindrical face. The two magnets 39 are offset from each other by 180°, and each one of them leads, in the direction of rotation of block 40 as indicated by the arrows on the drawing, an end of magnet 42 by approximately 30°, all for a reason that will be explained below. The plane of rotation of magnet 42 is located closely adjacent to but not in contact with a first magnetically operated reed switch 44. A second reed switch 41 is located closely adjacent but not touching the side surface of block 40 and magnets 39. The nature of the two switches 41 and 44 are that they will close and then open, thus producing an electrical pulse, whenever the magnets, 42 on the one hand the two magnets 39 on the other hand, are aligned with their respective switches. Switch 44 comprises three terminals, a fixed terminal G which is grounded, a second fixed terminal which is attached to a suitable power supply by a line 46, and a moveable contact M which is attached to a line 43. Switch 41 may be identical to switch 44, and its moveable terminal M is attached to a line 45.

Not shown but also included in the apparatus of the invention is a power supply which may be plugged into the readily available 110—115 v.AC service current. The electrical portions are DC and the power supply includes means not shown to put out direct current at the various voltages required by the various portions of the circuitry, all in a manner well known to those skilled in the art. It is significant that the voltage of the current supplied through line 46 from said power supply to the two switches 41 and 44 is in the range of about 3 to 5 v.DC which is large enough to prevent the pulses when handled in the subsequent circuitry from being affected by miscellaneous or stray electrical signals in the area.

One function of the structure shown in FIG. 2 is to transform the 2 revolutions per gallon at shaft 18 into 50 revolutions per gallon at shaft 38 and therefore 100 electrical pulses per gallon at switch 44. To this end, pulleys 20 and 24 have a 2 to 1 speed relationship whereby shaft 32 will rotate at 4 revolutions per gallon. Gear 34 has a 12.5 to 1 step-up speed relationship to pinion 36 whereby shaft 38 will rotate at 12 1/2 times the speed of shaft 32 which is the desired 50 revolutions per gallon. Switch 44 will cycle twice for each full revolution of magnet 42. As is obvious, of course, in the event that a pump for conversion is encountered wherein the flow meter shaft equipment to 18 rotates at some speed other than 2 revolutions per gallon, this may be easily accommodated by adjusting the relationship of the two pulleys 20 and 24, and/or the relationship of the gear 34 to the pinion 36.

Means are also provided to prevent the creation of extraneous pulses at switch 44. Switch 41 and its associated magnets 39 are utilized for this purpose. Switches 41 and 44 are of the normally open, momentary make type. The moveable contacts M thereof are normally biased towards their respective grounds G, and move onto the supply or "live" terminal only when a magnet is aligned with the switch. One source of spurious pulses is the situation that could occur if the pump should happen to stop in a position wherein the magnet 42 is close to but slightly to either side of the aligned position with its switch 44. Such a happenstance could result in "chatter" in switch 44, that is, repeated cycling of moveable contact M back and forth between its two fixed contacts. Such "chatter" would result in the creation and transmission of many extra pulses which would result in error. Therefore, to the end of preventing such chatter or creation of extraneous pulses at switch 44, or by any other means, a solid-state binary circuit component F, known in the art as a "flip-flop," is provided. Flip-flop F is of the SET/RESET input variety, i.e., a signal supplied to its set terminal S, via line 43 from s switch 44, will cause a signal to be present at its output terminal A. The output terminal of this type of flip-flop are of the "ASSERTION/NEGATION" (A,N) type, but the output terminal N is not utilized in the circuit of the invention and is therefore not shown. The nature of device F is that once a signal has been supplied to terminal S the output signal at terminal A will hold steady regardless of whatever else occurs at terminal S. Thus, all chatter or the like spurious signals in switch 44 between valid pulses are stopped at flip-flop F. A signal from switch 41 via line 45 supplied to terminal R resets device F, turns off the signal at output terminal A, and prepares terminal S for receipt of another valid signal. Thus, the array of magnets and switches shown permit transmission of a valid signal from switch 44 each time magnet 42 is aligned therewith, and then prevents transmission of any additional signals until approximately 120° of rotation of shaft 38 later, (see FIG. 3), at which time one of the magnets 39 will align with switch 41 thereby preparing flip-flop F for receipt of another valid signal from switch 44. Another advantage of this array of flip-flop F and switchs 41 and 44 and their associated magnets is that the input to the remaining circuitry, described below, is protected for a total of approximately 240°, or two-thirds of each rotation, of the rotation of block 40 against externally spuriously generated pulses which might come from other sources, such as vehicular ignition systems, during actual dispensing of the gasoline. Conversely, the input side of the circuit is open to receive pulses for only about one-third of total operating time, and that time is exactly when valid pulses are generated.

As will appear more clearly below, the relatively long pulse, proportional to 120° of rotation of shaft 38, produced at terminal A could be directly utilized in the remaining circuitry. However, such a long pulse is deemed somewhat undesirable for several reasons, and in any case is not in accordance with the best and accepted electronic circuit design practices. Therefore, means are provided to shorten this pulse, and, additionally, optional means are provided to amplify the shortened pulses before transmitting to the remainder of the circuitry. The amplifying means is optional depending on the physical distance and length of wire between the pulse generating assembly 16 and the circuitry 14, as is well known to those skilled in this art. To this end, output line 48 from the pulse generating assembly 16 may include a one-shot multivibrator 47a and may include a line dryer 47b. A one-shot multivibrator produces an output pulse synchronized with the rising (or falling) edge of the input pulse. The output pulse width is independent of the input pulse width and is determined by the time constant of the one-shot device. A line driver is used to transmit a pulse over a long cable. It supplies enough current to overcome the cable capacitance and to transmit the pulse with minimum distortion.

Referring to FIG. 1, the 100 pulses per gallon present in line 48 are supplied to circuit 14 and simultaneously go to a solid state adding device 50 a gallons counter 52, via a pulse shaper 51, and to a dollars accumulator 60. Here again, pulse shaper 51 is an optional item and would be used where the length of wire between the computing circuitry and the pulse generating apparatus is long.

It is to be understood that the showing of FIG. 1 has been partly idealized for purposes of illustration in that the flow paths of the signals are not exactly as shown in FIG. 1, but rather are as shown in FIG. 5. The circuit will first be described in terms making it analogous to a more conventional electrical circuit, i.e., FIG. 1, it being understood that the circuit is actually in the nature of a digital computer, as shown in FIG. 5. The latter part of this description will describe the FIG. 5 circuit in its actual binary form. A dual description is being used because it is thought that the analogous description and the block diagram of FIG. 1 will aid in understanding the logic and the actual circuit.

Adder 50 is analogous to a normally open, momentary make switch. A line 54 connects the input side of adder 50 to the output of a price digiswitch 56. Digiswitch 56 is analogous to a variable voltage supply, and may be thought to constantly out out a voltage proportional in value, with respect to the overall voltage scaling factor of the circuit, to one-hundredth of the price of a gallon of gasoline. Referring to FIG. 4, a front view of the operating console of circuit 14 is shown. FIG. 4 should be periodically referred to as the other two digiswitches, the displays, and the selector switch are referred to in this specification. Each pulse in line 48 can be thought to momentarily close the internal switchlike circuitry in adder 50 to permit the signal from line 54 to pass through a line 58 to a dollar accumulator register 60.

The 100 pulses per gallon in line 48 which pass through gallons counter 52, and optionally through pulse shaper 51, continuously operate said counter to keep track of the total number of gallons dispensed. The 100 pulses per gallon pass from the counter via a line 62 to a gallons accumulator 64.

The money handling portion of the circuit starting with accumulator 60, and the gallons handling portion of the circuit starting with accumulator 64 are similar to each other. Accumulator 60 holds the signals received via line 58 from adder 50, which are equivalent to the corresponding dollar amount of gasoline dispensed as the pump 12 continues to operate, and puts out the same signal in a pair of output lines 66 and 68. Line 66 feeds a dollar display device 70, see FIG. 4, to display to a customer the dollar value of gasoline dispensed. Line 68 feeds the signal from accumulator 60 to a comparator device 72. Comparator 72 is also fed with a signal from a dollar digiswitch 74 via a line 76. Digiswitch 74 includes four thumbwheels 78 by which the user or the attendant may preset the dollar amount of gasoline to be dispensed to the nearest one cent. Element 74 will produce a signal proportional to the preset dollar amount in line 76, and when the increasing signal from accumulator 60 in line 68 equals the signal in line 76 from digiswitch 74, comparator 72 will thereupon produce a signal in its output line 80. Line 80 ends at one terminal of a three-position switch 98, see FIGS. 1 and 4.

Similar to the above description of the dollar handling portion, the gallon handling portion includes a gallon display device 82 which is fed the signal from gallons accumulator 64 via a line 84, which signal is proportional to the increasing number of gallons as gasoline is dispensed. The output of accumulator 64 is fed via a line 86 to a gallons comparator device 88. A gallons digiswitch 90 having three thumbwheels 92 provides a signal via a line 94 proportional to the selected number of gallons to the nearest tenth of a gallon. When the increasing signal in line 86 equals the signal in line 94 from the gallons digiswitch, comparator 88 will produce a signal which is transmitted via a line 96 which ends at three-position switch 98. A line 100 connects the common point of switch 98 to flow stopping means 102 in pump 12. The three-position selector switch 98 has a third terminal which is not used in the circuit, and is marked "manual" in FIG. 4. By use of switch 98 the operator chooses the shutoff mode, i.e., the preset dollars preset gallons, or "fill-up" with the conventional automatic nozzle.

As will appear more clearly below in the description of the actual solid state circuit, accumulator 64 is optional. It need not be used unless the circuit is also to serve as a data transmitter in addition to an at-the-pump computer, in which case it would serve to hold the accumulated gallons data until the data transmission system is ready to receive that information.

No particular configuration of the flow stopping means 102 are shown in that a plurality of different such means could be used. For example, a signal when present in line 100 could be utilized to activate a relay to break the power circuit to the main motor driving the pump in pump assembly 12. As another example, the signal in line 100 could be utilized to close a solenoid valve to stop the flow of gasoline from pump assembly 12.

In the preferred embodiment of the invention which has been built, the circuit is entirely solid state, and in binary coded decimal (BCD) form. In this form, the various components may be made of commercially available integrated circuits, see table below. The two displays 70 and 82, and the three digiswitches 56, 74 and 90 are commercially available in BCD form, thereby eliminating the need for conversion circuit elements.

In the digital computer circuit of the invention, signals proportional to the actual numbers are transmitted from part to part and are handled by means of the binary decimal code. Thus, for example, the digiswitches actually produce a set of signals which together represent some number in BCD code. The counter 52 is a BCD device that counts in the code and sequence. In the BCD code, each digit requires four binary bits to make up a number. As is known, each binary bit may be either on or off, usually represented by one or zero, respectively. The first bit represents eight if it is on, the second bit represents four if it is on, the third bit represents two if it is on, and the last bit represents one if it is on.

Consequently, the code is as follows:

BINARY CODED DECIMALS

| | |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

Note that this code has a capacity up to 15, i.e., 1111. This fact will be referred to below.

At this juncture a brief explanation of binary arithmetic may be helpful. For a fuller explanation of this branch of mathematics, reference may be had to "Digital Computer Design Fundamentals," by Y. Chu, McGraw Hill, copyright 1962, pgs. 1—87. Briefly, a number system may be to any base. The commonly used number system is decimal using the base 10. This means that there are 10 possible values in any column or digit location, but when the sum value in a column exceeds nine then "one," the value of the base, 10 in this case, must be carried to the next higher digit location. In the binary number system the base is two and therefore there are only two possible values in any column. When adding in the binary number system, the following possibilities only exist.

```
   1      1      0      0
  +1     +0     +1     +0
   0      1      1      0
  and
 carry
  one
```

It is a mathematical peculiarity of binary arithmetic using the 8421 code that if a binary six is added to a binary number between 10 and 15 inclusive, the result is one carried to the next stage and a binary number equal to the original number less 10. The following example will illustrate:

```
Base Ten        Binary (8421,BCD)
   10           1010
   +6           0110
   16           0000 = 0        10 less 10 = 0
                and carry one
   14           1110
   +6           0110
   20           0100 = 4        14 less 10 = 4
                and carry one
   13           1101
   +6           0110
   19           0011 = 3        13 less 10 = 3
                and carry one
```

The fact is utilized in the present invention to convert the system to binary coded decimal rather than pure binary. As mentioned above, the circuit of FIG. 5, can produce a number as large as 15 in its output, 8+4+2+1, but it is desired that the largest number in the output be 9 so that the output may be easily converted to decimal. The circuit of FIG. 5, in its overall aspects, senses when the result of an addition performed in a single-digit adder is between 10 and 15 inclusive, and when this occurs, automatically adds 6 to the output, thus reducing the output number by 10, and carries one to the first signal adder stage of the next digit adding device. How this is done appears below.

A setting on any one of the three digiswitches produces a number represented in the above code which is always present in the output cable from that digiswitch. It will be appreciated that each "line" in FIG. 1, and the word "line" as used herein generally, may often actually represent a number of conductors equal to four times the number of digits to be transmitted. For example, the line 76 interconnecting digiswitch 74 and comparator 72 will have 12 conductors since it is desired to have three digits to have a capacity up to $9.99. The "lines" 48, 58, 62 and 68 are similar to the cables 66, 76, 84 and 94, that is, multiple conductors, but the first mentioned group of "lines" are internal to the circuitry and are therefore provided by the printed circuit boards which carry the integrated circuit chips rather than actual cables.

It is to be noted that the circuit displays four significant digits each for gallons and dollars. The two displays 70 and 82, see FIG. 4, require, from the customer's viewpoint, only three significant digits. The extra digit capacity is utilized in the dollars display to provide a tenth of a cent register 71, and in the gallons display register 82 to provide a hundredths of a gallon display 83. The two display positions 71 and 83 are preferably physically smaller than the displays of the more significant digits. Present wholly mechanical registers in use in the popular above ground dispensing pumps have this fourth digit capacity in that the wheel carrying the last significant digit has a vernier scale graduated in tenths so that tenths of the last significant digit can be read if desired.

The two comparators 72 and 88 are in the nature of coincidence gates. That is, the signal from the dollar or gallon digiswtich is always present on one side of the comparator, and the changing BCD coded number set of signals as the dollars or gallons increase is present at the other side of the comparator. When the two numbers are equal or coincident, then the comparator produces its output signal in the line 80 or 96. The comparators are an array of commercially available coincidence gate integrated circuit chips. The comparators need not be BCD but only binary since they do not produce any coded signal but only compare binary coded signals. The fact that the actual signals are BCD has no effect on the operation of the comparators. The comparators can be expanded to handle any number of bits since they are made up of interconnected individual circuits, each known as an "exclusive or" circuit, in such a way as to perform a comparison function.

The accumulators 60 and 64 are in the nature of holding registers, and similar to the comparators, need not be BCD but can be simply binary devices which hold the signals received from the adder 50 and keep the signal displayed on the displays 70 and 82 until the adder supplies the next signal. As mentioned above, the gallons accumulator 64 is optional.

Adder 50 adds one one-hundredth of the unit price present on cable 54 to an internal register, and upon the completion of each full 1 cent puts out a signal via line 58 to change the dollar display 70 by a penny, as will appear below. The counter 52 has means to perform this same function in the gallons handling portion of the circuitry in terms of one tenth of a gallon rather than 1 cent. At the time the apparatus of the invention was built no BCD adder of this type was commercially available.

As mentioned above, the showing of FIG. 1 and the associated explanation is analogous only and for purposes of ease of understanding. Referring to the actual computer circuitry of FIG. 5, there is shown an exploded view of those actual parts represented by all or parts of adder 50, accumulator 60, display 70, comparator 72, and other elements not represented in FIG. 1. Many of these parts and their functions are integrated together or intermixed in the circuitry. The gallons handling portion of the circuitry is not shown in full detail but it is simpler and analogous to the money handling portions shown. Additionally, some of the gallons handling circuitry utilizes some of the circuitry shown in FIG. 5, as will be clear to those skilled in the art.

The circuit of the invention operates with binary coded decimal numbers. Therefore, adder 50 comprises seven individual digit adding devices 104, four only being shown for the sake of clarity and only one of which is further exploded in FIG. 5. Seven digits are needed because the money is handled in units of one one-hundredth of the unit volume price. Using the 8421 binary code, each individual digit is made up of four separate signals. Referring to the exploded digit adding device 104 in FIG. 5, said device comprises four one bit binary full adders 106. On the drawing, each adder 106 is followed by a dash and a number indicating which digit in the 8421 code it handles. Each of the adders 106 is a commercially available solid-state binary component which will, in binary form, add as many as three bits supplied to it, producing a sum, and carrying to the next stage when needed. Commercial particulars on the adders 106 appear in the table below. For convenience, the particular digit handled by each adder 106 has been drawn on it in FIG. 5.

Each adder 106 has two outputs, a sum and a carry, each of which may be zero or one. When a carry signal is produced it is transmitted to the next higher stage either directly or indirectly. The sum lines from the four adders 106 shall be indicated by reference numeral 108 followed by a dash number indicating which adder the line is associated with, for example, 108-2. Similarly, the carry lines are indicated by 110 followed by the appropriate dash number.

Each of the digit adding devices 104 are internally connected by a single conductor 112, which carries, in effect, the value of 10, from one of the digit adding devices 104 to the next digit device 104. Thus, the line 112 from the first digit adder 104 feeding the second exploded digit adder 104 may or may not have a signal on it. The first conductor 112 feeds a one-bit binary half adder 114 and simultaneously feeds an AND gate 116. A half adder is similar to a full adder except that it can accept only up to two inputs, whereas a full adder can accept up to three inputs. An AND gate is a solid-state device which produces a signal in its output line only when there is an input signal in all of its input lines. Thus, the AND gate 116 will produce a signal in its output line 118 when there are signals in all of conductors 112, sum line 108-1 and another sum line 108-8 which feeds it on its input side. Half adder 114 has a sum line 58a and a carry line 124. The signal on line 58a is one of the four signals making up one of the digits carried by the group of 16 conductors making up "line" 58 in FIG. 1.

The signals on line 124 and 110-1 comprise all the inputs to an OR gate 126, which also has an output line 128. An OR gate is a solid-state component which produces a signal in its output line when there is a signal on any one of the input lines feeding it.

The combination of half adder 114 and OR gate 126 at the first or "one" position of each of the digit adding devices 104 is required in order to accommodate the possibility of a carry over signal in conductor 112 being provided from the preceding state. In the event there are signals in both lines 108-1 and 112, then a signal will be created in lines 58a and 124. The nature of the circuit is such that it is impossible for a signal to be on both of lines 124 and 110-1 at the same time because if there is a carry signal on line 110-1 there must be no signal on line 108-1. If there is no signal on line 108-1, then there can be no signal on carry line 124 even if there is a signal on line 112.

The circuit includes two AND gates 130 and 132, and an OR gate 134. Gate 130 is fed by sum lines 108-8 and 108-2, and gate 132 is fed by sum lines 108-8 and 108-4. The output lines 136 and 138 of the gates 130 and 132, respectively, comprise two of the four inputs to OR gate 134, the remaining two inputs being lines 110-8 and 118. The output line 112 has a tap line 140 which feeds both a half adder 142 and a full adder 144. Half adder 142 is also fed by line 108-2, and has an output line 58a and a carry line 146. Full adder 144 is fed by lines 140, 146, and 108-4, and produces outputs on one of the lines 58a and a carry line 148. The last or "8" position of the result in "line 58" is produced by a half adder 150 which is fed by lines 148 and 108-8. The carrying capability of half adder 150 is not utilized because the possibility of a carry over digit is taken care of by the array of gates 116, 130, 132, and 134.

In the event the sum of the numbers in a particular digit adding device 104 should exceed 9, a sum signal must necessarily be present on line 108-8 and at least one of lines 108-4 and 108-2. When this occurs, the combination of 8+4 will be sensed by gate 132, and/or the combination if 8+2 will be sensed by gate 130. A signal in either of their output lines 136 and 138 will be transmitted to and through OR gates 134, and via lines 112 and 140 into the "4" and "2" output adders, to thereby automatically add a binary six to the final output in conductors 58 while simultaneously carrying one by providing a signal in line 112 for transmission to the first stage of the next higher digit adding device 104. Thus the peculiarity of binary arithmetic set forth above is utilized to make the circuit operate with binary coded decimal numbers.

The logic of the computing circuitry includes utilizing each pulse delivered on line 48 from pulse generating portion 16 to cause the signal from digiswitch 56, proportional to one one-hundredth of the price of a gallon of gasoline, to be entered into the circuitry and added to the previously accumulated total. Means are also provided to cause the circuitry to hold each total, feed each total back to the "front end" of the circuitry, and add each incoming signal to the previously accumulated total to thereby generate a new "previously generated total," which is then added to the next incoming signal, etc.

To this end, means are provided to, in effect, make each pulse delivered on line 48 into two signals which have a time delay between them. These two signals are utilized in the circuit, as will appear below, to inherently and automatically provide timing between the various computational operations. To this end, a series array of one-shot multivibrators 152, similar in type and operation to the one-shot multivibrator 47a described above, are provided in line 48. In the embodiment of the invention which has been successfully built and used, four one-shots 152 were utilized, and signal 48 was tapped by a "line" 154 after the first two one-shots, and again by a "line" 156 at the end of the array. As stated above, the word "line," as used herein, very frequently will refer to a multiplicity of conductors, which may be cables, as are "lines" 154 and 156, or printed circuit conductors, or internal connections in the solid-state devices, or the like. Thus, each individual pulse on line 48 is first present on line 154, and some length of time later, the same pulse is present on line 156. As will appear below, the exact length of time is unimportant, so long as it is finite and long enough to allow accumulator 60 to operate.

Accumulator 60 utilizes these two signals which are created from each individual pulse to accomplish the above stated mode of operation. Only selected portions of the accumulator are shown in the drawing, it being understood that other conventional capabilities, such as means to reset to zero, and the like, will be provided. In the successfully built and used embodiment of the invention, the portion of the accumulator associated with each digit adding device 104 was built up of an array of eight modified flip-flops. The nature of these modified flip-flops is that of a normally closed, momentary make switch, however, the "memory" capacity of a flip-flop to hold signals received on its input side is utilized. Referring to FIG. 5, the eight flip-flops are arranged in an upper row of four indicated by reference number 158 followed by the appropriate dash number, and a lower row of four indicated by reference numeral 106 followed by the appropriate dash number. A line 162, followed by the appropriate dash number, interconnects the output side of each upper row flip-flop with the input side of each lower row flip-flop 160. A line 164, followed by the appropriate dash number, interconnects the output side of each lower row flip-flop with a decoder device 166. Device 166 is a commercially available item which transforms the BDC digital present on the lines 164 on its input side into a single representing the particular digit in true decimal form. Ten conductors interconnect each decoder 166 with each digit display device 70 or 82, which conductors are indicated by reference numeral 66 in FIG. 1 in the money handling part of the circuitry. The output of the decoder is a single signal which causes the appropriate digit to light up or otherwise be displayed in the display device. In the successfully built embodiment of the invention, the displays are gas filled display tubes with means to selectively cause any one of 10 digits in the tube to be visible. Such tubes are well known and utilize a selective ionization principal.

Means are provided to feed each total as generated back to the input side of each digit adding device 104. To this end, a conductor 168, followed by the appropriate dash number, taps into conductor 164, and feeds the signal present thereon as one of the inputs to each full adder 106.

The manner of operation of this part of the circuitry will be best understood by an example. Initially, prior to commencement of pumping of gasoline, all the flip-flops 158 and 160 are in their normally closed condition. A zero reset button, not shown, may be provided, on the control panel or other convenient location, and so connected in the circuit as to establish all initial conditions throughout the circuit, as will be obvious to those skilled in the art. When the circuitry is thereafter turned on, a price signal is immediately present on line 54, it is added to zero in adder 50, and the total signal is immediately present on conductors 58 feeding the input sides of the upper row 158 in accumulator 60. The solid-state devices utilized in the circuit respond in very short periods of time, a few millionths of a second as an indication of orders of magnitude. Therefore, "immediately" as used herein is not literally correct, but is fairly close.

Upon commencement of dispensing of gasoline, the first pulse arrives on conductor 48. This pulse proceeds through the first two one-shots 152 and is then present on conductor 154. The signals on line 154 opens the upper row in the accumulator, i.e., momentarily makes these "normally closed switches," so that the pervious total produced by adder 50, which in this case is zero plus the signal in line 54, proceeds to the input side of the lower row 160. Chronologically, first the upper row 158 closes, and thereafter the initial pulse on line 48 will have passed through the second two one-shots 152 and be present on line 156. The signal on line 156 momentarily makes "the normally closed switches" 160 of the lower row, which causes the previous total signal to pass through conductors 164, through decoder 166 and be displayed on display 70. For purposes of clarity of explanation, let it be assumed that this description refers to one digit adding device 104 and its associated part of accumulator 60, and further that the signal on line 54 which feeds that particular digit adding device is the digit 2. Thus, display 70 first showed zero as its initial condition, and now shows two. Further, assume that the digit adding device being described, because of the nature of the price, should display a 4 (2+2) upon receipt of the next pulse on line 48. The first pulse has now completed its course through the circuitry and assume the second pulse from the pulse generating portion 16 is present on line 48. Of course, the circuitry will handle the pulses very much faster than they could possibly be produced. There is no interim storage between pulses, since the seven digit adding devices 104 handle the fractional cents triggered by each and every pulse.

In the time prior to arrival of the second pulse, adder 50 has received a signal proportional to the prior generator total 2, as an input via conductors 168. Adder 50 has immediately added this prior total to the price signal present on line 54, and has caused this new total, namely 4, to be present on line 58 feeding the input side of the upper row 158. The second pulse on line 48 proceeds through the first two one-shots 152, and is present on line 154, thus momentarily opening the upper row and causing the new total of 4 to be present on line 162. The upper row then closes. Thereafter, the second pulse on line 48 proceeds through the second two one-shots 152 and is present on line 156, thus causing the lower row to open, which permits the new total of 4 to pass through the decoder 166 and be displayed on display 70. Lower row 160 immediately closes, the signal proportional to 4 feeds back through line 168, and the new signal, proportional to 6, is immediately present on lines 58. However, it is significant that each new total, 6 up to this point, is prevented from proceeding any further since the upper row 158 has heretofore been closed awaiting receipt of the next, third, pulse. The circuit, of course, continues to operate in this manner so long as additional pulses are received.

Thus, foolproof, inherent, and automatic timing between the various portions of the circuitry are provided by the array of one-shots 152, and the array of flip-flops 158 and 160 in accumulator 60. As an incidental matter, the type of accumulator shown and described is generally known to those skilled in the art as a bistable latch.

AND gate 116 senses signals on lines 108-8, 108-1, and the carry line 112 from the preceding digit adding device 104. Gate 116 and its connections are somewhat redundant for purposes of sensing the number 10 (8+1+1) since this will be picked up by gate 130. However, gate 116 serves the additional purpose of providing increased response time because the carry output to the next adder 104 is transmitted upon creation of a signal on line 112 rather than after the addition in the adder has taken place. This speeds up total addition time and is sometimes called "look-ahead carry."

COMPONENT LIST

| Element | Maker | Part No. | Comments |
|---|---|---|---|
| Displays | Burroughs (Nixie) | B 5991 | Many competing devices available. |
| Digiswitches | Digitran | #411 | Do. |
| Flip-flops | Texas Instruments | SN 7476N | |
| Counter 52 | do | SN 7490N | |
| One-shots | Fairchild | 9601 | |
| Comparators | do | 4510 | |
| Line drivers | do | 9614 | |
| Reed switches | Hamlin | MRH-DT | |
| Decoders | Fairchild | 9315 | |
| "And" and "Or" gates | Texas Instruments | SN 5400; SN 5401; SN 5410 | NAND gates, can be used for either function. |
| Belt 22 and its gears | PIC | FA 176 | |
| Switch 98 | | | Standard item, many available. |
| Latches 158 and 160 | Fairchild | 9308 | Dual 4-bit latch. |
| Adders 106 | Texas Instruments | 7483 | 4-bit binary full adder, one chip. |

While the invention has been described in detail above, it is to be understood that this detailed description is by way of example only, and the protection granted is to be limited only within the spirit of the invention and the scope of the following claims.

We claim:

1. In apparatus that dispenses liquid at a money price per unit volume of liquid dispensed, the combination comprising means to supply a shutoff signal to said dispensing apparatus when said dispensing apparatus has dispensed a preset and variable quantity of liquid determined in terms of units of volume of said liquid or in terms of money value of said liquid, first signal supplying means to supply a signal proportional to a variable preset number of units of volume of liquid to be dispensed, second signal supplying means to supply a signal proportional to a variable preset money amount of liquid to be dispensed, third signal supplying means to supply a signal proportional to the variable money price per unit volume of liquid being dispensed, means to serially supply a predetermined number of pulses per unit volume of liquid dispensed, computation means receiving all of said pulses and said signal from said third signal supplying means and comprising means to produce an output signal which changes in response to receipt of each of said pulses and which is proportional to the increasing money value of the quantity of liquid being dispensed as it is being dispensed, first coincidence gate means to receive all of said pulses and the signal from said first variable signal supplying means and comprising means to produce said shutoff signal when the accumulated number of pulses is equal to the signal from said first variable signal supplying means, and second coincidence gate means to receive the output signal of said computation means and the signal from said second variable signal supplying means and comprising means to produce said shutoff signal when the output signal of said computation means is equal to said signal from said second variable signal supplying means.

2. The combination of claim 1, said apparatus comprising a retail marketing gasoline pump, means to stop the flow of gasoline through said pump in response to said shutoff signal, and means to select the shutoff mode comprising means to selectively connect said shutoff signal responsive means to the output of said first coincidence gate means or to the output of said second coincidence gate means or to neither of said first and second coincidence gate means whereby the flow of gasoline through said pump may be stopped by other flow stopping means in said gasoline dispensing apparatus.

3. The combination of claim 1, and accumulating means to accumulate the signals received from said computation means and to hold a signal proportional to said accumulated signals until the next succeeding signal is received from said computation means.

4. The combination of claim 3, said accumulating means comprising a bistable latch comprising a first normally closed stage and a second normally closed stage arranged in series circuit, means to create first one pulse and then another pulse from each pulse supplied to said computation means, means to utilize the first created of said pair of pulses to momentarily open the first stage of said bistable latch, means to utilize the last created of said pair of pulses to momentarily open said second stage of said bistable latch, means to feed back the output of said bistable latch to the input of said computation means, and wherein the time required for the first stage of said bistable latch to open and then reclose is less than the time elapsed between creation of the first and the last of said two pulses.

5. The combination of claim 4, said pulse creating means comprising a series circuit arrangement of a plurality of one-shot multivibrators, means to transmit a pulse of said series of pulses after it has passed through some of the multivibrators of said plurality of multivibrators less than all of them to thereby create said first created pulse, and means to transmit the same said pulse of said series of pulses after it has passed through all of the multivibrators of said plurality of multivibrators to thereby create the last created pulse of said two pulses.

6. The combination of claim 3, means to display the increasing money value of the liquid being dispensed as it is being dispensed, and means to connect said display means to said accumulating means.

7. The combination of claim 1, said computation means and said first and second coincidence gate means comprising a solid-state electronic circuit, said pulses comprising electrical pulses, and said signals between the various last-mentioned means comprising electrical signals, said first, second and third signal supplying means comprising digiswitches adapted to supply a signal proportional to the numerical value of the various variable quantities supplied by each of said first, second and third signal supplying means, respectively.

8. The combination of claim 1, said dispensing apparatus comprising a retail marketing gasoline pump having a flow meter shaft which rotates at a predetermined number of revolutions per unit volume of liquid dispensed, said pulse supplying means comprising speed changer means having input means, output means, and internal connecting means between said input means and said output means, means to connect said flow meter shaft to said speed changer means input means, and pulse-generating means in operative cooperation in with said speed changer means output means.

9. The combination of claim 8, said pulse-generating means comprising a magnet on said speed changer means output means in operative cooperation with an electrical reed switch.

10. Pulse-generating apparatus for use with machinery which produces an output measured in units, said machinery having a member which moves in a cycle and which completes a predetermined number of cycles per unit output, the improvement comprising means to convert said predetermined number of cycles of movement of said member to a predetermined number of pulses, said converting means comprising a speed changer, said speed changer having input means and output means, means to connect said input means of said speed changer to said cylindrically moving member of said machinery, said speed changer comprising means to interconnect said input means and said output means of said speed changer, said output means of said speed changer comprising means operatively cooperable with pulse generating means and including means to prevent the creation of spurious pulses; and the speed relationship of the connecting means between said input means of said speed changer and said cyclically moving member, the speed relationship internal to said speed changing means interconnecting said input means and said output means both being selected so as to change said predetermined number of cycles to said predetermined number of pulses at said pulse generating means, said machinery comprising a retail marketing gasoline pump, and said cyclically moving member comprising the rotating flow meter shaft of said pump.

11. The combination of claim 10, said predetermined number of cycles of said flow meter shaft comprising 2 revolutions per gallon of gasoline dispensed, and said predetermined number of pulses comprising 100 pulses per gallon of gasoline dispensed.

12. The combination of claim 10, said speed changing means comprising a gear box.

13. The combination of claim 12, said pulse-generating means comprising a reed switch, and said means on the output means of said gear box comprising a magnet cooperable with said reed switch to close and then open said reed switch to thereby produce a pulse each time said magnet is aligned with said reed switch.

14. The combination of claim 13, said means to prevent the creation of spurious pulses comprising means to prevent creation of pulses at said reed switch other than when said magnet passes through the aligned position with said reed switch, said preventing means comprising a second reed switch operatively cooperable with a pair of magnets, said output means of said gearbox comprising a cylindrical mounting block which carries said first mentioned magnet in an end face thereof and said pair of magnets on the cylindrical face thereof with the pair of magnets offset from each other by about 180° and located on said mounting block so that each magnet of said pair of magnets leads an end of the aligned position of said first mentioned magnet with its associated reed switch by an acute angle in the direction of rotation of said mounting block, a flip-flop, means to connect the output of said first mentioned reed switch to the SET terminal of said flip-flop, and means to connect the output of said second mentioned reed switch to the RESET terminal of said flip-flop.

PO-1050
(5/69)

UNITED STATES PATENT OFFICE
CERTIFICATE OF CORRECTION

Patent No. 3,598,283          Dated August 10, 1971

Inventor(s) Ronald L. Krutz and Thomas J. Villella

It is certified that error appears in the above-identified patent and that said Letters Patent are hereby corrected as shown below:

Column 2, line 42, "by" should be --be--.

Column 3, line 10, change "FIG. 0" to --FIG. 2--.

Column 3, line 20, after "pumps" insert --of many different configurations, and as stated above, with pumps--.

Column 4, line 24, change "equipment" to --equivalent--.

Column 6, line 32, delete "pre-set dollars" (second occurrence).

Column 10, line 68, "106" should be --160--.

Column 11, line 1, after "single" insert --signal--.

Signed and sealed this 22nd day of February 1972.

(SEAL)
Attest:

EDWARD M. FLETCHER, JR.          ROBERT GOTTSCHALK
Attesting Officer                 Commissioner of Patents